United States Patent [19]
Holmes

[11] Patent Number: 4,667,119
[45] Date of Patent: May 19, 1987

[54] TRIGGER SWITCH

[76] Inventor: Zealy M. Holmes, Martin Rd., Edelstein, Ill. 61526

[21] Appl. No.: 635,456

[22] Filed: Jul. 30, 1984

[51] Int. Cl.[4] .......... H02H 1/00
[52] U.S. Cl. .......... 307/326; 307/119; 307/140; 200/157; 173/170
[58] Field of Search .......... 307/116, 119, 139, 140, 307/142, 326; 200/157; 173/170

[56] References Cited

U.S. PATENT DOCUMENTS

| | | | |
|---|---|---|---|
| 1,702,245 | 2/1929 | Black et al. | 200/157 |
| 1,720,541 | 7/1929 | Coates | 200/157 |
| 1,741,406 | 12/1929 | Decker | 200/157 |
| 4,006,333 | 2/1977 | Halts | 200/157 |
| 4,063,600 | 12/1977 | Krzes | 173/12 |
| 4,523,065 | 6/1985 | Heggelund | 200/157 |
| 4,549,097 | 10/1985 | Ulmer | 307/326 |

*Primary Examiner*—A. D. Pellinen
*Assistant Examiner*—Derek S. Jennings
*Attorney, Agent, or Firm*—Lockwood, Alex, FitzGibbon & Cummings

[57] ABSTRACT

A trigger switch for use with hand held power tools includes a trigger which is movable in response to finger pressure thereon. A pair of normally open switch contacts are closed when finger pressure in excess of a first threshold pressure is applied to the trigger. In the event the applied finger pressure exceeds a second, greater threshold pressure, the switch contacts are opened to deactuate the tool. An insulating member shields the switch contacts when the second threshold pressure is exceeded to prevent closure of the contacts upon release of the trigger. A second set of switch contacts, closable in response to finger pressure in excess of the second threshold, may be provided to control actuation of an electrical tool brake mechanism.

9 Claims, 8 Drawing Figures

FIG. 1
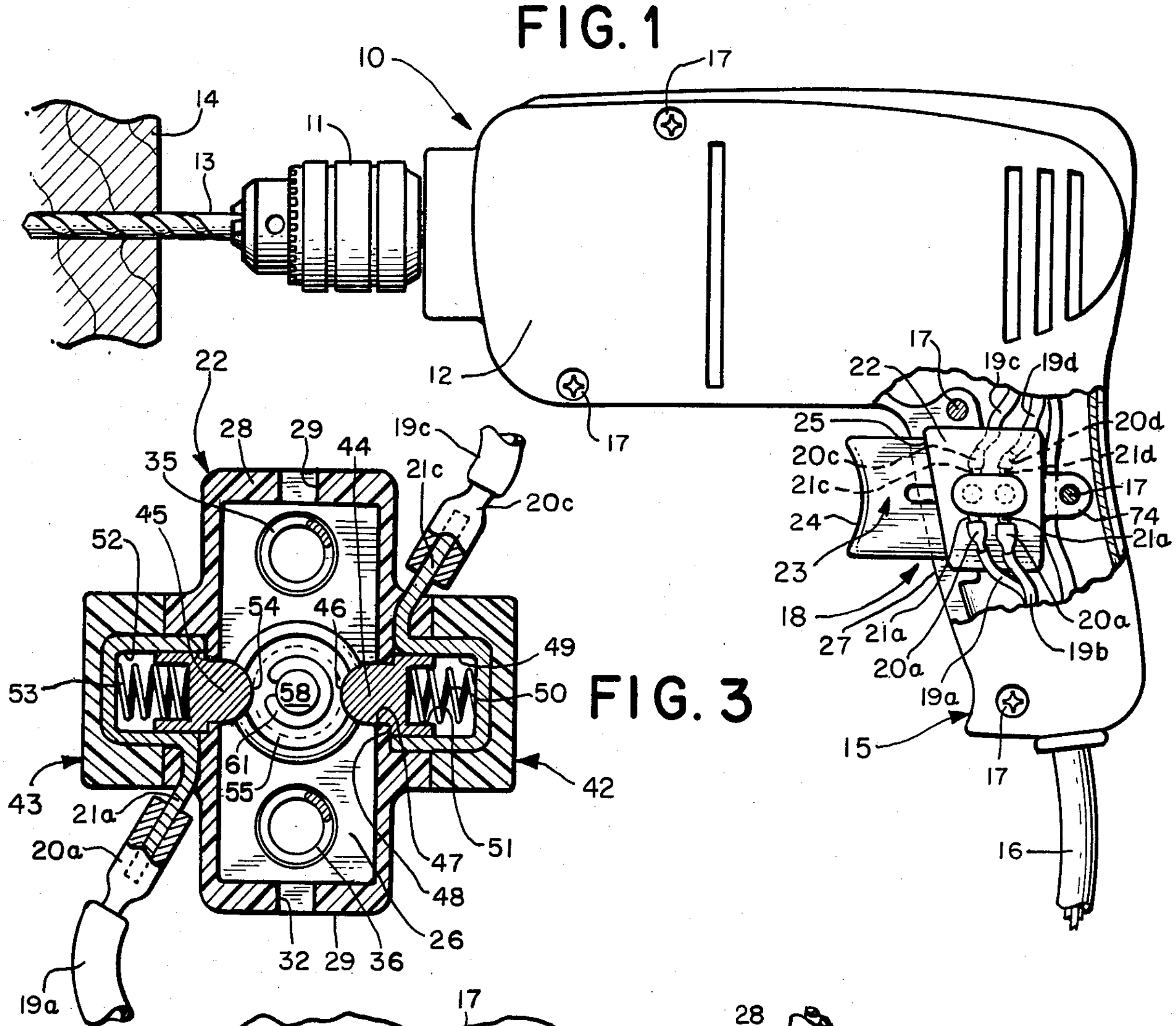
FIG. 3
FIG. 2
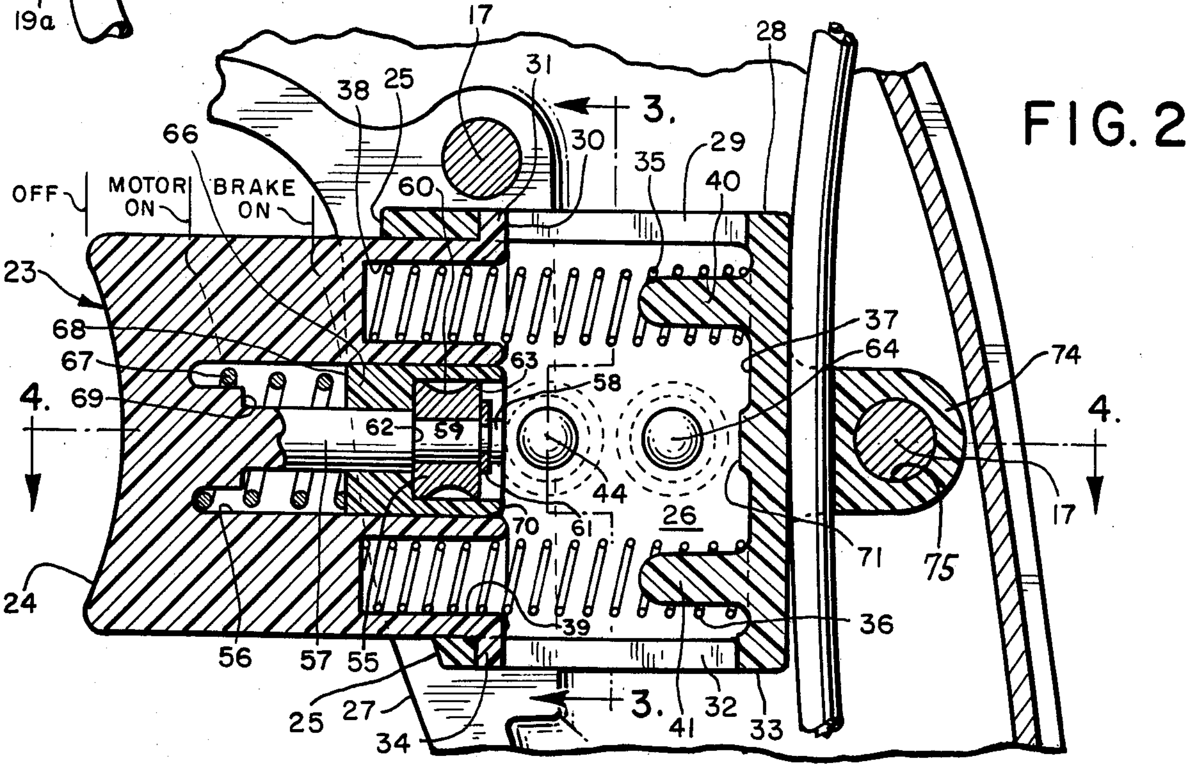

TRIGGER SWITCH

BACKGROUND OF THE INVENTION

This invention relates generally to electrical switches and more particularly to manually operable trigger switches for use in hand-held power tools and the like. The invention also relates to power tools equipped with such switches.

Electrically driven hand-held power tools, such as portable drills, saws and sanders, are suited to a wide variety of applications and permit substantial savings of both time and physical effort required to perform a variety of tasks. While the overall safety record in the use of such tools has been and continues to be excellent, further effort to improve this record is nevertheless worthwhile.

Despite all reasonable precaution, it sometimes happens that hand-held power tools pose a risk of injury to their users. One such risk is the risk of electrical shock which, however small, is always present around devices of an electrically driven nature. Another such risk is the risk of reverse torque being applied to the hands of an operator as when, for example, a drill bit or saw blade binds in a workpiece during boring or sawing operations.

To minimize the chances of injury in the event a tool binds in a workpiece, the desirability of immediately stopping the tool upon the occurrence of such binding has been recognized. In one arrangement, a portable electric drill was provided in which a handle was pivotally mounted to the drill housing as to allow pivotal movement between the housing and the handle over a limited range. An electrical switch, responsive to such pivotal movement formed part of the motor drive circuit. If a drill bit became stuck in the workpiece, the resulting reverse torque caused the handle to pivot relative to the housing, causing the switch to open and the tool to stop. While the arrangement was effective, it had the disadvantage of being difficult to retrofit into existing units.

The present invention is based on the observation that when a difficulty, such as an inadvertent electric shock or unanticipated binding, is encountered in using a hand-held power tool, the normal reaction of the user is to grip the tool evermore tightly. When the tool is equipped with a conventional trigger switch, the result is that power continues to be supplied to the tool thereby increasing the possibility of injury or damage.

The present invention utilizes the user's normal instinctive reflex reaction when trouble is encountered, to automatically and quickly deenergize the power tool. This is accomplished by providing a trigger switch which, when subjected to normal finger pressure, energizes the tool, but which deactivates the tool when subjected to increased finger pressure. Thus, when difficulty is encountered and the operator's grip is tightened, the tool is automatically deactivated to avoid or minimize injury or damage. The deactivation can include not only an interruption of the flow of current to the tool's motor, but also activation of a braking mechanism for internally absorbing the energy of reverse torque. The braking function can be optional depending on the characteristics of the tool involved and the degree of sophistication of its design. Since the invention can be incorporated in replacement trigger switch assemblies, it may easily be retrofitted into existing power tools having conventional trigger switches.

In view of the foregoing, it is a general object of the present invention to provide an assembly for automatically deactivating power tools in the event an unanticipated, potentially dangerous situation is encountered.

It is another object of the present invention to provide an assembly for automatically deactivating hand-held power tools in the event difficulty is encountered which may easily be retrofitted to existing power tools having conventional trigger switches.

SUMMARY OF THE INVENTION

The invention is directed to a trigger switch for use in hand-held power tools and the like. The trigger switch includes a trigger and a normally open electrical switch for controlling the electrical power supplied to the motor of the tool. The trigger switch further includes a first actuating mechanism responsive to pressure applied to the trigger for electrically closing the switch when pressure on the trigger exceeds a first threshold pressure. A second actuating mechanism responsive to pressure applied to the trigger opens the switch when pressure on the trigger exceeds a second higher threshold pressure. When pressure on the trigger is less than the first threshold pressure, the switch is open and power is not supplied to the motor of the tool. When pressure on the trigger exceeds the first threshold pressure, the switch is closed thereby applying power to the motor. When pressure on the trigger is sufficiently great as to exceed the second threshold pressure, the switch is opened, halting the application of power to the motor and providing for the activation of an optional electrically-energized braking mechanism if its use would be desirable and prudent in the particular tool application.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and of which:

FIG. 1 is a side elevational view, partially in section, of a hand-held portable electric drill equipped with a trigger switch constructed in accordance with the present invention.

FIG. 2 is an enlarged fragmentary sectional view of the trigger switch illustrated in FIG. 1.

FIG. 3 is an enlarged sectional view of the trigger switch illustrated in FIG. 2 taken along line 3—3 thereof.

DESCRIPTION OF THE PREFERRED EMBODIMENT

Figure 4:
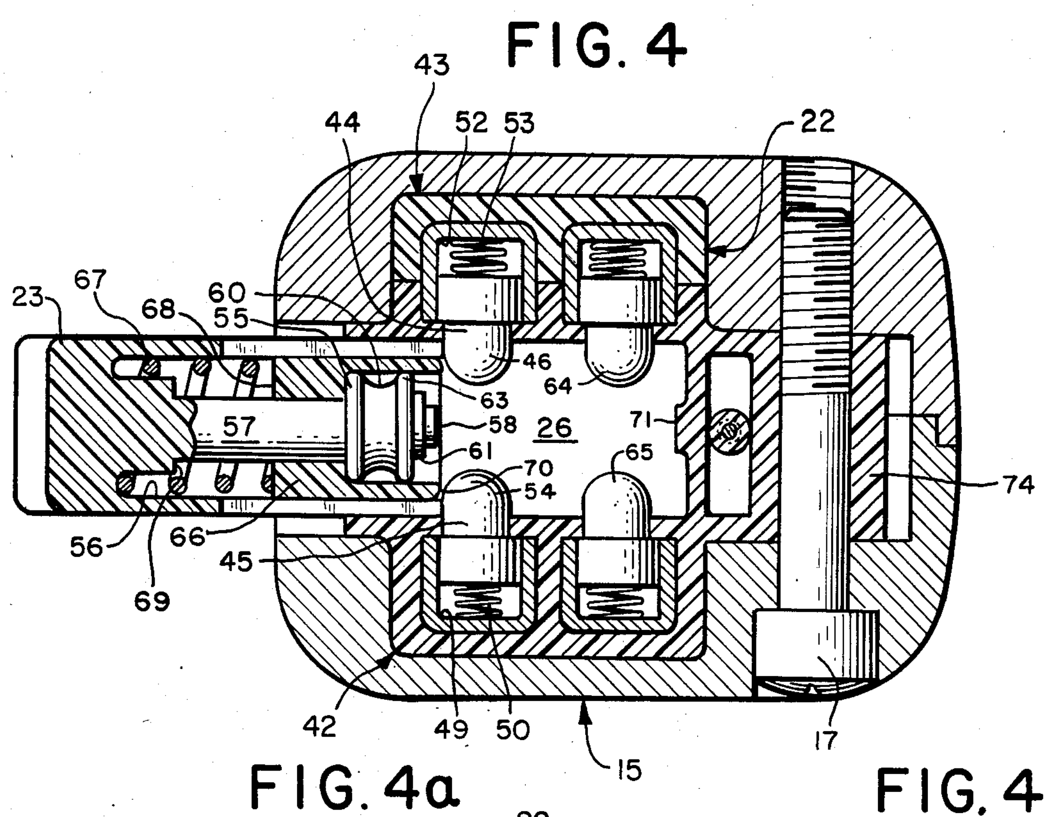
FIG. 4 is an enlarged sectional view of the trigger switch illustrated in FIG. 2 taken along line 4—4 thereof, showing the switch in a first OFF position.

Referring to the drawings and in particular to FIG. 1, a hand-held, portable, electrically driven tool having a trigger switch constructed in accordance with the present invention is designated generally by reference numeral 10. For illustrative purposes, the tool 10 takes the form of a portable electric drill though it will be appreciated that the trigger switch may be advantageously utilized with a variety of other hand-held power tools such as electric saws, and power sanders.

The electric drill includes a chuck 11 at one end of an elongated housing 12 for engaging and tightly gripping the shank of a conventional twist drill bit 13. An electric motor (not shown) within housing 12 is mechanically coupled through a suitable arrangement of gears to the chuck 11. When electric power is applied to the motor, chuck 11 twists drill bit 13 to bore a hole in a work piece 14. To facilitate hand-held use of the tool, housing 12 is provided with a downwardly depending handle portion 15 at its rearward end. Handle 15 is preferably shaped and dimensioned as to be firmly and comfortably gripped by the user. Power for energizing the tool is provided through an electrical cable 16 which enters the housing through the undersurface of handle 15. To facilitate assembly of the electric drill, housing 12 is manufactured in two halves and is fastened together by means of a plurality of screw fasteners 17.

To control actuation of the motor, the drill is provided with a trigger switch which is indicated generally by reference numeral 18 and is mounted partially within handle 15 adjacent the main body of housing 12. Trigger switch 18 is located as to fall comfortably and naturally under the index finger of the user when the tool is gripped for use. In known manner, the trigger switch is electrically connected with the motor as to interrupt current to the motor when the drill is not in use. Electrical communication with the switch is provided by means of a plurality of conductors 19*a*–19*d*, each one of which includes a slip-on type connector 20*a*–20*d* at one end, for engaging respective ones of a plurality of complimentary shaped terminals 21*a*–21*d* projecting from the switch.

Trigger switch 18 comprises generally a relatively stationery housing 22 and relatively movable trigger 23 mounted for reciprocation relative thereto. The trigger 23 comprises an elongated member of generally rectangular cross-section, and is formed of an injection molded plastic or similar durable, electrically insulating, material. The forward end 24 of trigger 23 engages the user's finger when the drill is in use and accordingly is preferably provided with an arcuate surface to enhance user comfort.

Trigger switch housing 22 comprises a generally rectangular member, also formed of a durable insulating material, and is dimensioned as to be fully contained within handle 15 of drill housing 12. Housing 22 is generally hollow and is provided with an opening at its forward end 25 to form an interior recess 26 (FIG. 2) in which the trigger 23 is mounted. The forward edge 27 of handle 15 is provided with an aperture through which trigger 23 projects when the trigger switch 18 is installed. When the switch is in the OFF position shown in FIG. 2, the leading edge 24 of trigger 23 projects well beyond the leading edge 27 of handle 15. When the user depresses trigger 23 by tightening his grip, trigger switch 18 provides electrical current to the drill motor to actuate electric drill 10.

The construction of trigger switch 18 is shown in detail in FIGS. 2–4. The outer dimension of trigger 23 closely matches that of housing interior recess 26 to permit the trigger to be slidably received therein. The uppermost wall 28 of housing 22 is provided with an elongated parallel walled slot 29 extending fully therethrough. At its rearward end 30, trigger 23 is provided with an upwardly projecting tab 31 dimensioned to be received within slot 29. Slot 29 does not extend fully to the forward edge of housing 22 and accordingly, forward travel of the trigger 23 is limited by reason of tab 31 contacting the forward edge of the slot. Similarly, rearward travel of the trigger 23 is limited by reason of the tab engaging the rearward end of the slot. A similar slot 32 formed in the lower wall 33 of housing 22 receives a downwardly projecting tab 34 formed at the rear of trigger 23. Accordingly, slots 29 and 32, together with tabs 31 and 34, constrain trigger 23 to lateral movement between well defined forward and rearward limits relative to housing 22.

In accordance with conventional practice, trigger switch 18 automatically returns to the OFF position upon release of the trigger 23. To this end, the switch is provided with a pair helical coil springs 35 and 36 mounted between the rearward surface 30 of trigger 23 and the rearward interior wall 37 of housing 22. Surface 30 is provided with circular recesses 38 and 39 for receiving the forward ends of springs 35 and 36 respectively, while a pair of pillars 40 and 41, integrally formed on rear wall 37, engage the opposite ends of the springs. Springs 35 and 36 are sufficiently stiff as to bias trigger 23 to its foward limit of travel in the absence of finger pressure on the trigger.

As shown in FIG. 3, housing 22 includes a pair of outwardly projecting extensions 42 and 43 on opposite sides thereof midway between upper and lower surfaces 28 and 33. These extensions contain switch contacts 44 and 45 which project into the interior 26 of housing 22.

Switch contact 44 comprises an electrically conductive member, preferably formed of a durable, highly-conductive metal, having a projecting hemispherically shaped end 46. End 46 is dimensioned as to protrude through an aperture 47 through the side wall of housing 22, while an anular ledge 48, formed immediately to the rear of end 46, limits the travel of the switch contact into housing interior 26.

The end of switch contact 44 opposite hemispherical end 46 is slidably received within the interior of a cup-shaped socket 49 which is electrically connected with terminal 21*c*, and which may be integrally formed thereon. Switch contact 44 is biased toward the interior 26 of housing 22 by means of a helical coil spring 50 disposed between the rear surface of contact 44 and the opposite interior surface of socket 49. Preferably, the rear surface of contact 44 is provided with a circular recess 51 for receiving spring 50. The spring is formed of an electrically conductive material to help assure a low resistance connection between the switch contact 44 and socket 49. Switch contact 45, which is preferably identical to contact 44, is received in a similar socket 52 connected to terminal 21*a*, and is inwardly biased by means of a helical spring 53.

As illustated in FIG. 3, switch contacts 44 and 45 are located opposite one another on housing 22. Switch contact 45 is also provided with a hemispherical end 54 which projects into interior region 26. Contacts 44 and 45 are dimensioned so that a gap is formed between ends 46 and 54 thereof and accordingly, the switch contacts are normally electrically open and isolated from one another.

To apply electrical current to the motor when trigger 23 is depressed, trigger switch 18 is provided with actuating means for providing electrical conductivity between switch contacts 44 and 45 in response to pressure on the trigger. To this end, a conductive, generally cylindrical switch closure member 55 is mounted to trigger 23 and is wedged between switch contacts 44 and 45 when the trigger is depressed to the MOTOR ON position shown in phantom in FIG. 2.

Switch closure member 55 is received in a generally circular recess 56 provided in the rear surface 30 of trigger 23 adjacent its center. A generally cylindrical, integrally formed pillar 57 projects from the forward end of recess 56 toward rear surface 30 in concentric alignment with the recess. The distal end 58 of pillar 57 extends to the plane of rear surface 30 as shown in FIG. 2. Adjacent distal end 58, the diameter of pillar 57 is reduced to form a generally cylindrical shaft 59 of relatively narrow diameter.

The switch closure member 55 is formed of a durable conductive material, preferably metallic, and is provided with an aperture through its center dimensioned as to receive shaft 59. The outer sidewall of member 55 is provided with a circumferentially extending concave groove 60, the curvature of which preferably matches that of the hemispherical switch contact ends 46 and 54. Switch closure member 55 is maintained in position on shaft 59 by means of a split-ring washer 61 between the member and distal end 58 of pillar 57. Opposite washer 61 the juncture of shaft 59 with the remainder of the pillar forms a ledge 62 which limits travel of the switch closure member 55 toward forward surface 24 of trigger 23. Accordingly, switch closure member 55 is constrained to travel with trigger 23 as it reciprocates relative to the housing 22.

The diameter of switch closure member 55 is somewhat greater than the minimum distance between switch contacts 44 and 45 when they are fully inwardly biased. Accordingly, when switch closure member 55 is wedged between the contacts, both contacts engage the member and electrical continuity is provided between the contacts. To facilitate passage of the switch contact member 55 between contacts 44 and 45, the leading edge 63 of the member is slightly rounded. When this edge contacts hemispherical switch contact ends 46 and 54, contacts 44 and 45 are outwardly displaced against their respective springs 50 and 52. Springs 50 and 52 thus serve to assure positive mechanical engagement between contacts 44 and 45 and the switch closure member 55 to provide a low resistance electrical junction.

As shown in FIG. 2, when the trigger 23 is in the OFF position, leading edge 63 of switch closure member 55 is laterally displaced from switch contact 44. Accordingly, before electrical cpntinuity can be established between the switch contacts, it is necessary that trigger 23 be depressed a distance sufficient to bring the member between the contacts. Since this requires springs 35 and 36 to be partially compressed, a first trigger threshhold pressure is thus established which must be overcome by finger pressure on trigger 23 before the trigger switch 18 is electrically closed.

In accordance with one aspect of the invention, the switch actuating means are adapted to open switch contacts 44 and 45 when pressure on trigger 23 exceeds a second threshhold pressure higher than the first threshhold pressure. To this end, switch contacts 44 and 45 are positioned so that when trigger 23 is fully depressed, switch closure member 55 extends fully beyond switch contacts 44 and 45 with the result that electrical continuity between the switch contacts is interrupted. In accordance with another aspect of the invention, an auxilary set of contacts 64 and 65 may be closed by the switch closure member 55 when trigger 23 is fully depressed and may be used to control additional circuitry, such as an electric brake mechanism, to rapidly halt rotation of the drill bit. Contacts 64 and 65 are identical to contacts 45 and 46 and are electrically connected with conductors **19*b* and 19*d* (FIG. 1**) respectively.

In the event the power tool user greatly tightens his grip on handle 15, as for example when an unanticipated difficulty arises in using the tool, trigger 23 is displaced from the MOTOR ON position of FIG. 2 to the BRAKE ON position shown in phantom therein. As previously developed, this interrupts electrical continuity between contacts 44 and 45 and, if the switch is so equipped, establishes electrical continuity between auxilary contacts 64 and 65, with the result that the power tool immediately stops.

To prevent reactuation of the tool as the trigger 23 is released from the BRAKE ON position to the OFF position, an insulating sleeve 66 formed of a rigid, durable, non-electrically conductive plastic or similar material, is slidably disposed on pillar 57 and serves to insulate contact closure member 55 from contacts 44 and 45 as the trigger is released. Sleeve 66 comprises a generally cylindrical member having an aperture extending axially therethrough and is dimensioned to be slidably receivable within recess 56 of trigger 23. The aperture through sleeve 66 is of relatively narrow diameter at the end of the sleeve which faces the forward edge 24 of trigger 23, and is of sufficiently large diameter at the end facing housing interior 26 as to receive switch closure member 55. A helical coil spring 67, disposed between the rear surface 68 of sleeve 66 and the innermost surface of recess 56, biases sleeve 66 outwardly along pillar 57 and against switch closure member 55. An annular ledge 69, formed near the base of pillar 57, limits movement of sleeve 66 toward the forward surface 24 of trigger 23.

Figure 5:
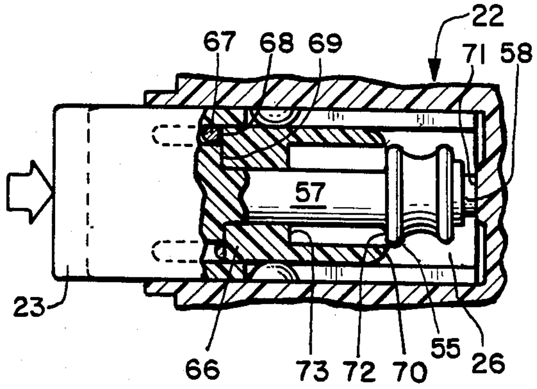
FIG. 5 is a fragmentary cross-sectional view similar to FIGS. 4*a*–4*c* of an alternate embodiment of the trigger switch in which a single pair of switch contacts is provided.

The operation of the trigger switch is clearly illustrated in FIGS. 4–5. When trigger 23 is in the OFF position, switch closure member 55 is drawn away from switch contacts 44 and 45 and is fully received within sleeve 66. As pressure is applied to trigger 23, both the sleeve 66 and switch closure member 55 are displaced toward hemispherical ends 46 and 54 of contacts 44 and 45. When the leading edge 70 of sleeve 66 engages switch contact ends 46 and 54, the resistance to further displacement of sleeve 66 is sufficient to overcome the bias of coil spring 67, and accordingly, the sleeve is precluded from further travel while closure member 55 continues to move toward contacts 44 and 45.

Upon further displacement of trigger 23, switch closure member 55 contacts switch contact ends 46 and 54 to electrically close contacts 44 and 45. Eventually, the member 55 reaches the position shown in FIG. **4*a* wherein hemispherical ends 46 and 54 are each received in concave groove 60 of the member. Concave groove 60, in cooperation with ends 46 and 54, provides a distinct detent which, while insufficient to overcome the restoring force provided by the helical springs 35 and 36 (FIG. 2**), can be distinctly felt by the operator to assist in maintaining the trigger in the ON position.

Figure 4A:
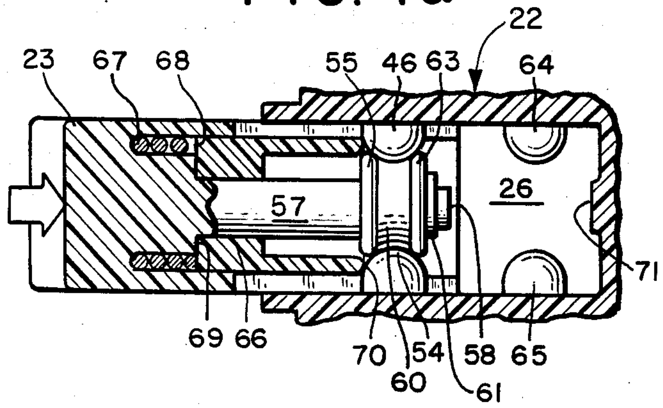
FIG. 4*a* fragmentary sectional view, similar to FIG. 4, showing trigger switch in its normal ON position.
Figure 4B:
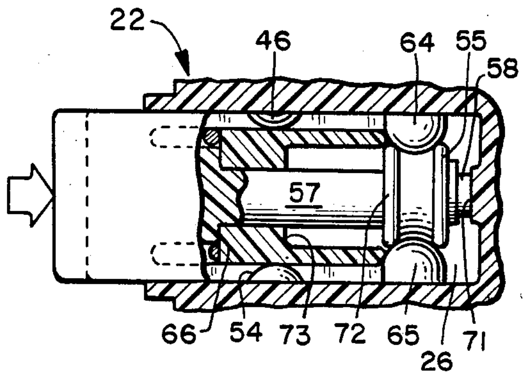
FIG. 4*b* fragmentary sectional view, similar to FIG. 4, showing the switch in a second OFF position.

When the switch is in the MOTOR ON position shown in FIG. 4*a*, the forward edge 70 of sleeve 66 rests against switch contacts 44 and 45 while the rear surface 68 of the sleeve contacts annular ledge 69 to fully compress spring 67. Additional pressure on trigger 23 causes switch closure member 55 to be displaced from between switch contact ends 46 and 54 to interrupt electrical continuity therebetween, while sleeve 66 is simultaneously forced between the switch contact ends. If the trigger switch is provided with auxiliary switch contacts 64 and 65, continued displacement of the trigger causes the switch closure member 55 to become wedged between those contacts to actuate an appropriate brake mechanism. A generally cylindrical protrusion 71 formed on rearward wall 37 engages distal end 58 of pillar 57 as illustrated in FIG. 4*b* to prevent further displacement of trigger 23.

Figure 4C:
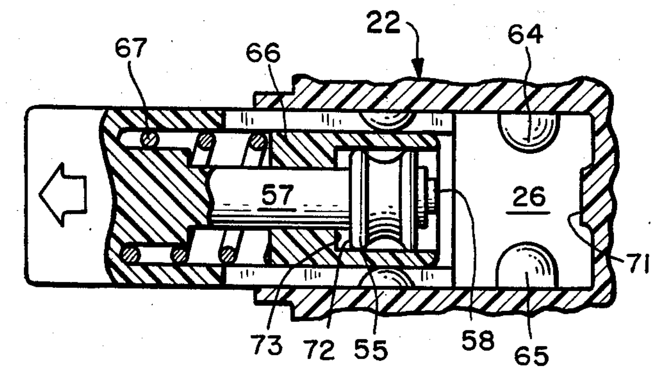
FIG. 4*c* is a fragmentary sectional view similar to FIG. 4 showing the switch being returned to the first OFF position following actuation to the second OFF position.

FIG. 4*c* depicts operation of the trigger switch as trigger 23 is released from the BRAKE ON to the OFF position. As pressure on the trigger is released, the bias of springs 35 and 36 (FIG. 2) causes trigger 23 to move in the direction shown by the arrow. Friction between sleeve 66 and switch contact ends 46 and 54, together with the force exerted by spring 67 causes the sleeve to remain between the switch contact ends as the trigger is released. Accordingly, the sleeve serves to insulate switch contacts 44 and 45 from the switch closure member as it passes between the contacts as the trigger is released to prevent re-energization of the tool. When the switch closure member 55 is fully received within the sleeve, the surface 72 of member 55 opposite leading edge 62 contacts an interior wall 73 of the sleeve to prevent further movement of sleeve 66 relative to pillar 57. As the trigger is released further, the force provided by springs 35 and 36 is sufficient to overcome the friction between sleeve 66 and contacts 44 and 45 thereby causing the sleeve to be withdrawn from between the contacts. Accordingly, once the trigger 23 is fully depressed, it can be fully released without establishing continuity between switch contacts 44 and 45.

To facilitate passage of sleeve 66 between switch contacts 44 and 45, its leading edge 70 is preferably rounded as illustrated.

FIG. 5 illustrates another embodiment of the switch in which only a single pair of switch contacts 44 and 45 are provided. In this switch, which is illustrated in the fully depressed position, no auxiliary contacts are provided and interruption of power to the tool is the means by which the tool is halted in the event the switch is fully depressed. This embodiment can conform in all respects to the one previously described except for the omission of the auxiliary contacts.

To depress the trigger from the MOTOR ON to BRAKE ON position, it is necessary to apply sufficient force to the trigger as to force the switch closure member from between contacts 44 and 45, and to force sleeve 66 therebetween. Accordingly, a second trigger threshold pressure, greater than the first threshold pressure, must be overcome before power to the tool is interrupted. The value of this second threshold pressure is a function of the size and shape of the switch closure member 55, switch contacts 44 and 45, sleeve 66 and the various springs used in the trigger switch assembly. Trigger switch 18 is preferably designed to provide a second threshold pressure which would not ordinarily be overcome by normal finger pressure during normal use of the tool, but which would be overcome in the event the user increased the strength of his grip in response to unanticipated difficulty.

To permit the trigger switch assembly 18 to be easily mounted within the handle 15 (FIG. 1) of electric drill 10, housing 22 includes a tab 74 projecting from its rear surface having an aperture (FIG. 2) 75 therethrough for receiving the threaded shank portion of one of screws 17. It will be appreciated, that a variety of other mounting techniques may be employed.

Though a particular embodiment of a trigger switch incorporating the features of the invention has been described in detail, it will be apparent that numerous other embodiments, differing widely in the details of their construction, could be provided without departing from the scope of the invention in its broader aspects. For example, while the trigger switch illustrated relies on a moving switch closure member to establish continuity between a pair of switch contacts, it would be possible to provide a switch in which a pair of switch contacts ar directly moved into contact with one another in response to displacement of a trigger. Furthermore, an arrangement of levers or cams could be included to provide direct and positive control over the movement of the insulating sleeve rather than the spring arrangement shown herein. Additionally, the shape of the trigger assembly can be vastly altered to suite the requirements of particular applications.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A trigger switch for use in a hand-held power tool comprising:

- a trigger housing;
- a trigger reciprocable in said housing in response to externally applied pressure;
- a pair of normally open electrical switch contacts in said housing which control the supply of electrical power to the tool;
- actuating means carried on said trigger and movable in response to movement of said trigger responsive to pressure on said trigger for opening and closing said contacts, said actuating means closing said switch when externally applied pressure on said trigger exceeds a first threshold pressure and opening said switch contacts when externally applied pressure on said trigger exceeds a second threshold pressure, said second threshold pressure being greater than said first threshold pressure, whereby said electrical switch is open when externally applied pressure on said trigger is less than said first threshold pressure, is closed when externally applied pressure on said trigger exceeds said first threshold pressure but is less than said second threshold pressure, and is open when externally applied pressure on said trigger exceeds said second threshold pressure; and
- insulating means carried on said trigger for preventing closure of said switch contacts when external pressure on said trigger in excess of said second threshold pressure is reduced to less than said second threshold pressure but more than said first threshold pressure;

said switch contacts being separated from one another and said actuating means comprising a generally cylindrical conductive member mounted to said trigger, said conductive member contacting said switch contacts when external pressure on said trigger exceeds said first threshold pressure and is less than said second threshold pressure.

2. A trigger switch as defined in claim 1 wherein said switch contacts are biased for movement toward one another.

3. A trigger switch as defined in claim 2 further including a second pair of normally open switch contacts, said second pair being closed by said actuating means when pressure on said trigger exceeds said second threshold pressure.

4. A trigger switch as defined in claim 3 wherein said insulating means comprise an insulating sleeve mounted for shielding movement around said cylindrical member.

5. A hand-held power tool comprising:

a housing;

a motor mounted in said housing;

a trigger mounted for reciprocative movement relative to said housing in response to externally applied pressure;

switch means in circuit relationship with said motor which controls the supply of electrical power to said motor;

actuating means carried on said trigger and movable in response to movement of said trigger for opening and closing said switch means, said actuating means closing said switch means when externally applied pressure on said trigger exceeds a first threshold pressure and said actuating means opening said switch means when externally applied pressure on said trigger exceeds a second threshold pressure, said second threshold pressure being greater than said first threshold pressure, whereby said switch means are open when externally applied pressure on said trigger is less than said first threshold pressure, are closed when externally applied pressure on said trigger exceeds said first threshold pressure but is less than said second threshold pressure, and are open when externally applied pressure on said trigger exceeds said second threshold pressure; and insulating means carried on said trigger for preventing closure of said switch means when external pressure on said trigger in excess of said second threshold pressure is reduced to less than said second threshold pressure but more than said first threshold pressure;

said swtich means comprising a pair of switch contacts separated from one another and said actuating means comprising a generally cylindrical conductive member for engaging movement relative to said switch contacts, said conductive member contacting said switch contacts when pressure on said trigger exceeds said first threshold pressure and is less than said second threshold pressure.

6. A hand-held power tool as defined in claim 5 wherein said switch contacts are biased for movement toward one another.

7. A hand-held power tool as defined in claim 6 further including a second pair of normally open switch contacts, said second pair being closed by said actuating means when externally applied pressure on said trigger exceeds said second threshold pressure.

8. A hand-held power tool as defined in claim 7 wherein said insulating means comprise a insulating sleeve mounted for sheilding movement around said cylindrical conductive member.

9. A trigger switch for use in a hand-held power tool comprising:

a trigger housing;

a trigger reciprocable in said housing in response to externally applied pressure;

a pair of normally open electrical switch contacts in said housing which control the supply of electrical power to the tool;

actuating means carried on said trigger and movable in response to movement of said trigger responsive to pressure on said trigger for opening and closing said contacts, said actuating means closing said switch when pressure on said trigger exceeds a first threshold pressure and opening said switch contacts when pressure on said trigger exceeds a second threshold pressure, said second threshold pressure being greater than said first threshold pressure, whereby said electrical switch is open when pressure on said trigger is less than said first threshold pressure, is closed when pressure on said trigger exceeds said first threshold pressure but is less than said second threshold pressure, and is open when pressure on said trigger exceeds said second threshold pressure; and insulating means carried on said trigger for preventing closure of said switch contacts when external pressure on said trigger in excess of said second threshold pressure is reduced to less than said second threshold pressure but more than said first threshold pressure;

said insulating means being reciprocable with respect to said trigger and spring biased towards separation therefrom.

* * * * *